UNITED STATES PATENT OFFICE.

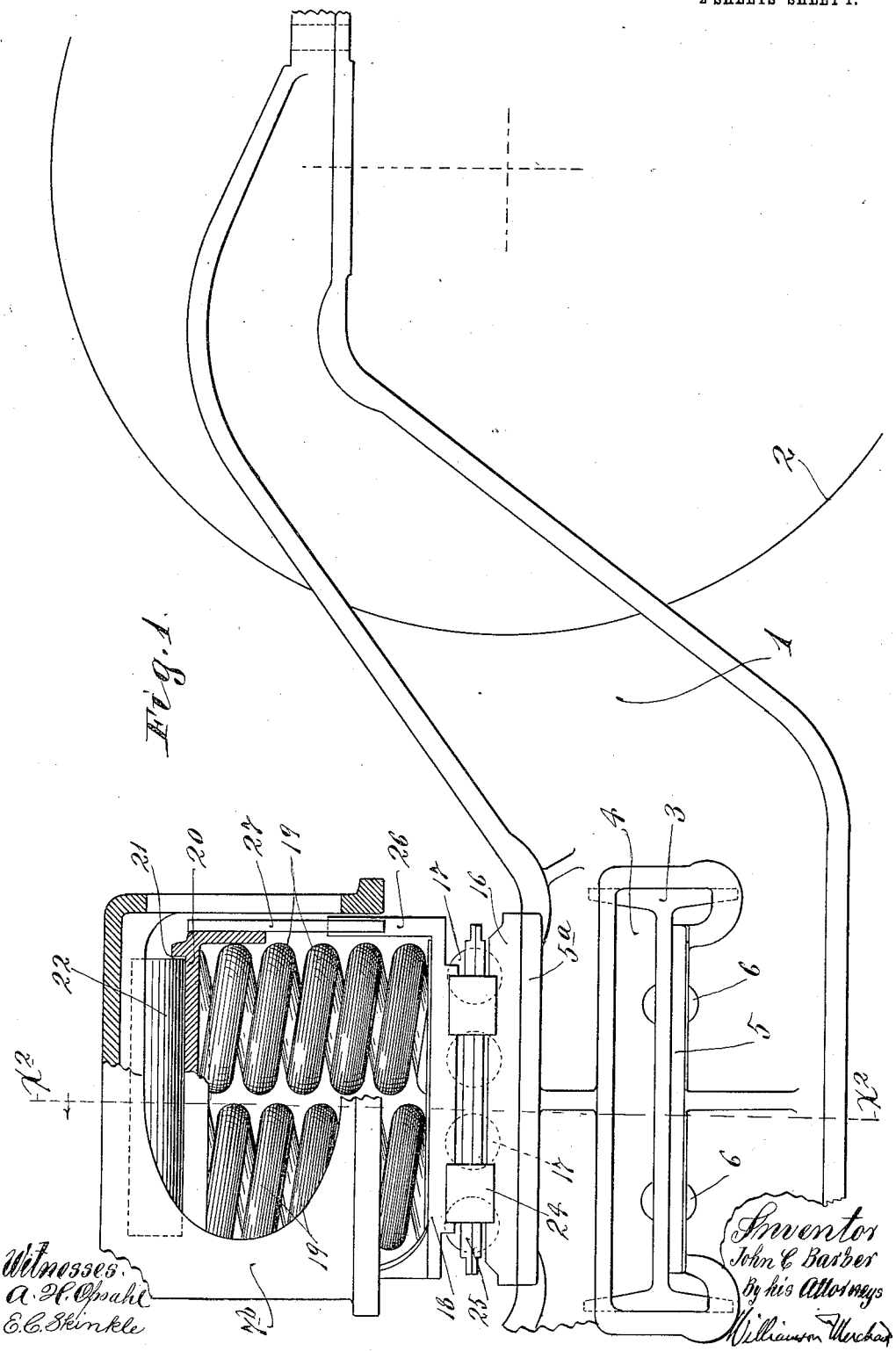

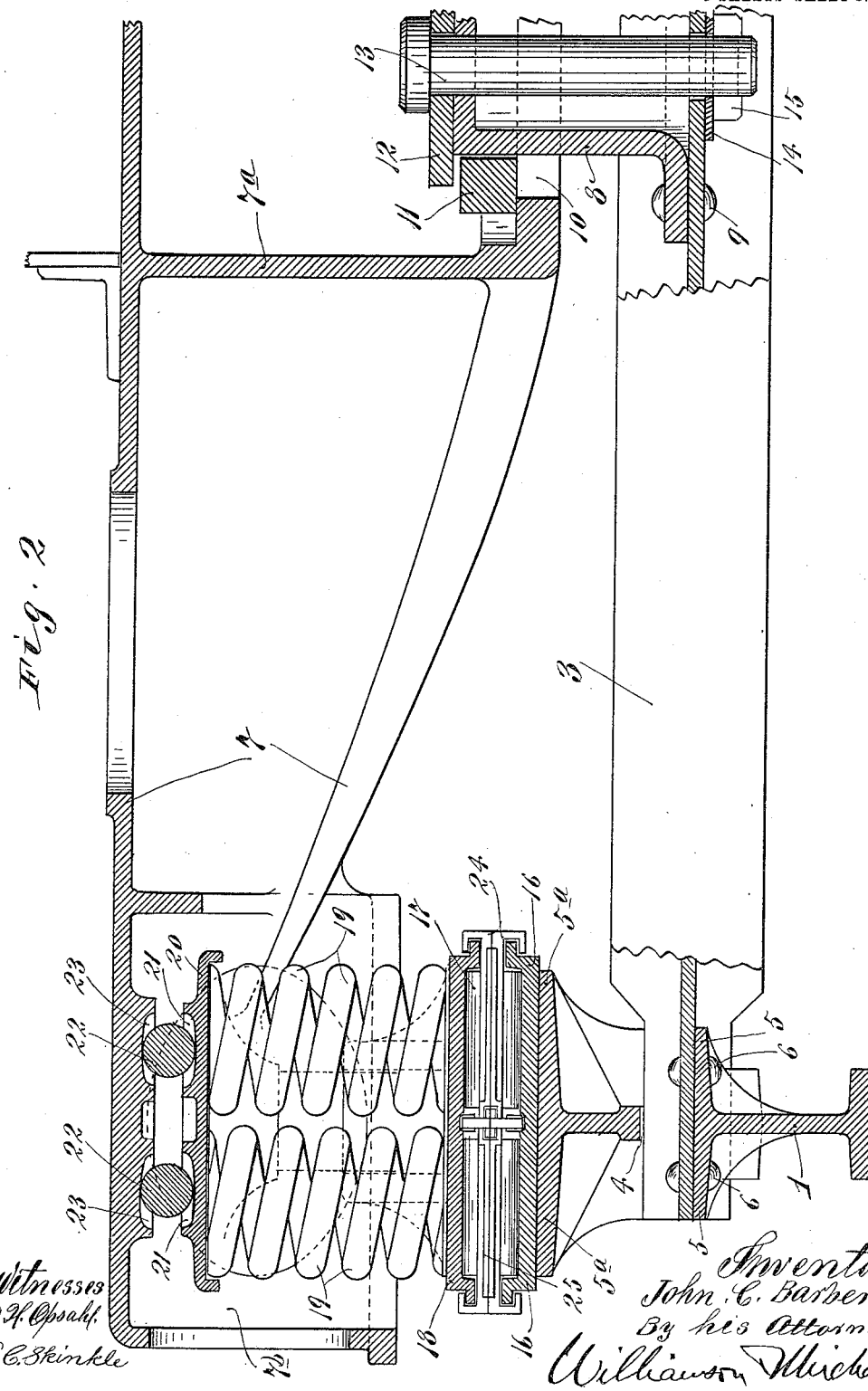

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

CAR-TRUCK.

1,065,018.                    Specification of Letters Patent.    Patented June 17, 1913.

Application filed April 12, 1913. Serial No. 760,612.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention relates to car trucks and is particularly directed to a modification of the construction disclosed and claimed more broadly in a companion application executed by me of even date herewith entitled " Car truck," and filed April 12, 1913, under Serial No. 760,611.

In the accompanying drawings which illustrate the present invention, like characters indicate like parts throughout the several views.

Referring to the drawings, Figure 1 is a view in side elevation with some parts broken away, and with some parts sectioned, and with some parts removed, showing a car truck designed in accordance with my invention; and Fig. 2 is a vertical section taken approximately on the line $x^2$ $x^2$ on Fig. 1.

The truck side frames 1 in the present instance, as in the said companion application, are preferably of cast steel drop girder type. Their upper ends rest on or are secured to the usual journal box, not shown. In Fig. 1, a portion of one of the wheels 2 is diagrammatically indicated. In this construction, as in the construction of the said companion application, the said frames 1 are rigidly connected by a heavy transom or cross tie, preferably in the form of an I-beam 3, but the ends of this transom, instead of being seated on the trucks of the intermediate portions of the side frames, are passed through openings 4 formed in the said side frames at the neutral axis thereof. At the bottoms of the openings 4, the side frames 1 are provided with laterally expanded horizontal bearing webs 5 to which the ends of the web of the transom 3 are rigidly secured, preferably by rivets 6. Also, the flanges of the said I-beam transom 3, at the ends thereof, are preferably cut or otherwise reduced so that they may be passed through the opening 4 which is advisably made of considerably less vertical width than the full width of the flanges of the said I-beam.

The numeral 7 indicates a car body bolster which is preferably a cast structure having a box-like central portion $7^a$ and box-like end portions $7^b$. The body bolster 7 is pivotally connected to the transom 3 for limited endwise movements transversely of the truck, and, as shown, this is accomplished in the following manner. The numeral 8 indicates a hub, the flanged lower end of which is rigidly secured to the web of the transom 3, by rivets 9, and the upper portion of which is extended upward through a longitudinal slot 10 formed in the bottom of the central box-like portion $7^a$ of the said body bolster. A heavy washer 11 surrounds the upper end portion of a hub 8 and rests upon the bottom of the said section $7^a$ of the body bolster. Another washer 12 overlies the washer 11 and is secured on the upper end of the hub 8 by a king bolt 13 that is passed axially downward through the said hub and through the web of the transom 3, and below the latter, is provided with a washer 14 and a retaining key 15. By the means described, the body bolster is connected to the transom with freedom for pivotal movements, for vertical movements and for endwise movements transversely of the truck, and in respect to the said transom.

Rigidly secured, or locally seated directly upon the expanded horizontal bearing webs $5^a$ of the truck side frames, and directly overlying the said side frames, are roller bases 16. Seated on the said roller bases 16 are bearing rollers 17, and seated on said rollers are combined roller caps and spring bases 18. Each combined roller cap and spring base 18 supports a group of truck springs 19, of which, as shown, there are four. Each group of springs 19 supports a combined spring cap and roller base 20. The said spring cap and roller base 20 are formed with dished or concave roller bearing seats 21 on which are placed rollers 22 that engage with similar, but inverted roller bearings seats 23 formed on the under surface of the top plate of the body bolster. The rollers 17 and coöperating bearing plates 16 and 18 afford the radial motion roller bearing devices of the truck, and the said rollers therefore, extend longitudinally of the transom 3 or approximately toward and from the pivotal connection between the said transom and body bolster. The rollers 22 and coöperating bearing plates afford the lateral motion roller bearing devices, and hence, the said rollers 22 are extended transversely of the body bolster 7 or longitudinally of the truck side frames. The elements 18, 19 and 20 partake of the radial movements of the body bolster but not of the endwise movements thereof. The bearing plates 16 and 18 have flanged inner and outer edges that overlap the ends of the rollers 17, and these end flanges are preferably held against separation, but free for traveling movements, by hook-like lugs 24 of a roller spacing device 25, which is applied to the rollers 17. The combined roller cap and spring base 18 is therefore held against movements transversely of the truck, and it is provided with upwardly extended grooved side flanges 26 that receive depending guide arms 27 of the combined spring cap and roller base 20. The said elements 26 and 27 are thus held against movements transversely of the truck frames but with the said element 20, free for vertical movements, as required to permit the free spring action. The roller engaging surfaces on the bearing plates 16 and 17 may be either flat or slightly concave so far as this invention is concerned, but the roller engaging surfaces of the seats 21 and 23 that engage with the lateral motion rollers 22 should be concave or reversely dished so that the weight of the load will tend to maintain the said rollers in intermediate positions, and consequently, the car body centered in respect to the truck frames.

Preferably, the boxed outer ends 7ᵇ of the body bolster 7 are formed with large openings through which the springs 19 and upper or lateral motion roller bearing devices may be seen. It is, of course, evident that the body bolster 7 is connected to the transom 3 with freedom for pivotal or radial movements, and for vertical movements, and for endwise movements, transversely of the truck, but is held in its coöperative association with the said transom and against separation thereof, by the king bolt 13 and coöperating washers and key, or equivalent devices.

What I claim is:

1. A truck having its side frames connected by a transom rigidly attached thereto below the tops and above the bottoms thereof, and antifriction bearing devices directly applied on top of said side frames immediately over the ends of the said transom.

2. The combination with side frames and a transom having its ends rigidly connected thereto below the tops and above the bottoms thereof, of a body bolster intermediately pivoted to said transom with freedom for sliding movements longitudinally thereof, and combined radial and lateral motion bearing devices directly and vertically interposed between said side frames and body bolster.

3. The combination with truck side frames and a transom having its ends rigidly connected thereto below the tops and above the bottoms thereof, of a body bolster intermediately pivoted to said transom with freedom for limited sliding movements, and for vertical movements, and combined radial and lateral motion bearing devices and truck springs vertically and directly interposed between said side frames and body bolster.

4. The combination with truck side frames and a transom connecting the same, of a body bolster intermediately pivoted to said transom with freedom for endwise and vertical movements, radial motion roller bearing devices applied directly on top of said side frames, springs supported on the upper member of said radial motion devices, and lateral motion roller bearing devices supported by said springs directly over said side frames and supporting said body bolster at its ends.

5. The combination with truck side frames and a transom having its ends rigidly connected to said side frames at points below the top and above the bottoms thereof, roller bearing plates secured on said side frames directly above the ends of said transom, radial motion bearing rollers on said roller bases, combined roller caps and spring bases seated on said rollers, truck springs seated on said combined roller caps and spring bases, combined spring caps and roller bases seated on said springs, connections permitting said combined spring caps and roller bases to move vertically, but to partake of the common movements of said combined roller caps and spring bases, and lateral motion bearing rollers interposed between said combined spring caps and roller bases and the ends of said body bolster.

6. The combination with truck side frames and a transom rigidly connecting the same, said transom having a hub at its center, of a body bolster having at its central portion a longitudinal slot embracing the upper end of the hub of said transom and thereby connecting the same with freedom for pivotal and endwise movements, a bolt and coöperating device holding said body bolster and transom against separation but permitting vertical movements of the former, and combined radial and lateral motion bearing devices and coöperating truck springs vertically and directly interposed between said side frames and the ends of said body bolster.

In testimony whereof I affix my signature in presence of two witnesses.

JOHN C. BARBER.

Witnesses:
H. M. EDGERTON,
F. L. BARBER.

Copies of this patent may be obtained for five cents each, by addressing the "Commissioner of Patents, Washington, D. C."